(12) United States Patent
Mannar

(10) Patent No.: US 8,239,553 B2
(45) Date of Patent: Aug. 7, 2012

(54) PROVIDING SERVICES FOR MULTIPLE BUSINESS CONSUMERS

(75) Inventor: Sateesh K. Mannar, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 546 days.

(21) Appl. No.: 12/109,208

(22) Filed: Apr. 24, 2008

(65) Prior Publication Data

US 2009/0271471 A1 Oct. 29, 2009

(51) Int. Cl.
*G06F 15/16* (2006.01)

(52) U.S. Cl. ........................................ 709/229; 709/227

(58) Field of Classification Search .................. 709/202, 709/227, 229
See application file for complete search history.

(56) References Cited

U.S. PATENT DOCUMENTS

| | | | | |
|---|---|---|---|---|
| 2003/0084350 A1* | 5/2003 | Eibach et al. | | 713/201 |
| 2005/0086330 A1* | 4/2005 | Perham et al. | | 709/220 |
| 2005/0188420 A1* | 8/2005 | Benantar et al. | | 726/3 |
| 2006/0034237 A1 | 2/2006 | Patrick et al. | | |
| 2006/0069777 A1* | 3/2006 | Kato et al. | | 709/225 |
| 2006/0095584 A1* | 5/2006 | Deolaliker et al. | | 709/240 |
| 2008/0201266 A1* | 8/2008 | Chua et al. | | 705/67 |
| 2009/0113459 A1* | 4/2009 | Miller et al. | | 719/328 |
| 2009/0171743 A1* | 7/2009 | Spiegel et al. | | 705/9 |
| 2009/0265312 A1* | 10/2009 | Jain | | 707/3 |

* cited by examiner

*Primary Examiner* — Phuoc Nguyen
*Assistant Examiner* — Steven Nguyen

(57) ABSTRACT

Methods, systems, and apparatus, including computer program products, for providing services to business organization clients involve receiving a request for a particular service, identifying configuration data relating to the request, sending a service request to a service provider of the service, and providing the service to a service consumer in accordance with data returned in response to the service request. The service consumer is identified from the request for a particular service. Configuration data corresponding to the service consumer is identified. The service provider for the service and resource data corresponding to the service are identified from the configuration data. A service request is sent to the service provider and data relating to the service is returned from the service provider. The service is provided to the service consumer in a shared runtime environment based at least in part on the received data relating to the service.

21 Claims, 5 Drawing Sheets

PROVIDING SERVICES FOR MULTIPLE BUSINESS CONSUMERS

TECHNICAL FIELD

This description relates to providing business services to a business service consumer.

BACKGROUND

As businesses angle for competitive advantage in the marketplace, they are apt to seek to develop and employ custom and proprietary tools to help them deliver their products and services efficiently and cost-effectively. Among the most valuable tools employed by modern businesses are software applications. The use of software applications in business has only increased with the rise of the internet and e-commerce. Businesses operate online storefronts offering and selling their products and services to clients of all types, from individual retail consumers to sophisticated corporate entities. Backend software services can be employed in conjunction with these and other online business applications to automate and deliver the objectives of the various business applications.

Some companies develop proprietary software systems to deploy the various applications and software-based services needed to automate and support their businesses. Developing a customized software system, while expensive, allows companies to have complete control over the design, maintenance, and compatibility of their software tools, allowing them to centralize design, integration, and maintenance of their business software. Other businesses elect to develop their software systems on a more piecemeal basis, adopting a patchwork of out-of-the box software applications, outsourced third-party service providers, as well as some customized business applications for critical applications requiring a customized software application. Businesses electing a piecemeal approach may do so with a hope of realizing cost-savings over enterprise software suites, trading the ease and efficiency of centralized software suites for the affordability of more generic solutions.

SUMMARY

Systems and methods can be implemented to provide business services to multiple business organization clients in a shared runtime environment.

In one general aspect, a request is received for a particular service provided by one of multiple service providers, the request identifying a first of multiple business organization clients. Each of the business organization clients has corresponding configuration data. First configuration data is identified corresponding to the first business organization client. A service provider for the particular service is identified based at least in part on the first configuration data. First resource data corresponding to the particular service is identified. A service request for the particular service is sent to the identified service provider, the service request identifying the first resource data. Data relating to the service request is received from the identified service provider. The particular service is provided to the first business organization client in a shared runtime environment based at least in part on the received data.

Implementations can include one or more of the following features. A second request is received for a second service provided by a service provider for the second service. The second request includes an identification of a second one of the business organization clients. Second configuration data is identified corresponding to the second business organization client. The service provider of the second service is identified based at least in part on the second configuration data. Second resource data is identified from the second configuration data corresponding to the second service. A service request for the second service is sent to the service provider of the second service, the service request identifying the second resource data. Data relating to the service request for the second service is received from the service provider of the second service. The second service is provided to the second business organization client based at least in part on the received data relating to the service request for the second service.

Additional implementations can include one or more of the following features. A second request for a second service provided by one of the service providers is received, and the second request includes the identification of the first business organization client. Second configuration data corresponding to the first business organization client is identified in response to the second request. A service provider of the second service is identified based at least in part on the second configuration data. Second resource data, corresponding to the second service, is identified from the second configuration data. A service request for the second service is sent to the identified service provider of the second service, wherein the service request for the second service identifies the first resource data corresponding to the second service. Data is received relating to the service request for the second service from the identified service provider of the second service. The second service is provided to the first business organization client in a shared runtime environment based at least in part on the received data relating to the service request for the second service.

Implementations can also include one or more of the following features. The request for a particular service comprises payload data related to the particular service. Providing the particular service comprises passing the data relating to the service request received from the identified service provider to the first business organization client. The data relating to the service request received from the identified service provider is processed prior to providing the particular service to the first business organization client in a shared runtime environment. Authentication data is received in connection with the identification of a first one of the business organization clients. The authentication data can include client credentials. Prior to sending the service request to the identified service provider, it is affirmed that the client credentials correspond to the first business organization client. Data including at least the service request, payload data relating to the service request, or received data relating to the service request is cached. A portion of the cached data is masked based, at least in part, on the first resource data. At least a portion of the transaction log is communicated to the identified service provider. A modification request is received from the first business organization client to modify configuration data relating to the first business organization client. The configuration data is modified in accordance with the modification request. Authentication data is received from the source of the modification request. The authentication data is processed to interpret whether the source of the modification request is authorized to modify configuration data relating to the first business organization client. The modification request can comprise a request to update the services available to the first organization client. A service update request is received from a first one of the plurality of service providers, wherein the service update requests updating configuration data related to at least one service administered by the service provider. The configuration data is modified in accordance with the service update request.

In another general aspect, at least one service provider is adapted to provide data corresponding to a request for a particular service. A plurality of business organization clients are adapted to transmit a request for a particular service. The request for a particular service can include the identification of the business organization client transmitting the request. A service manager is adapted to receive the request for a particular service and identify the first business organization client from the request. The service manager is further adapted to store configuration data corresponding to each of the plurality of business organization clients and identify the at least one service provider and first resource data based at least in part on the first configuration data. The service manager is also adapted to send the service request to the at least one service provider, the service request comprising the first resource data, receive the data corresponding to the request for a particular service, and provide the particular service to the first business organization client in a shared runtime environment based at least in part on the received data corresponding to the request for a particular service.

Implementations can include one or more of the following features. The service manager can include a user authentication module, wherein the user authentication module is adapted to identify the first business organization client from the request. The user authentication module is further adapted to receive user credentials associated with the first business organization client and authenticate the first business organization client based at least in part on the user credentials. The service manager can include a configuration module, wherein the configuration module is adapted to identify the at least one service provider and first resource data based at least in part on the first configuration data. The service manager is adapted to simultaneously provide multiple services to a plurality of business organization clients The service manager includes a logger module adapted to monitor service manager performance and store data relating to service manager performance

DESCRIPTION OF DRAWINGS

Like reference symbols in the various drawings indicate like elements.

DETAILED DESCRIPTION

Figure 1A:
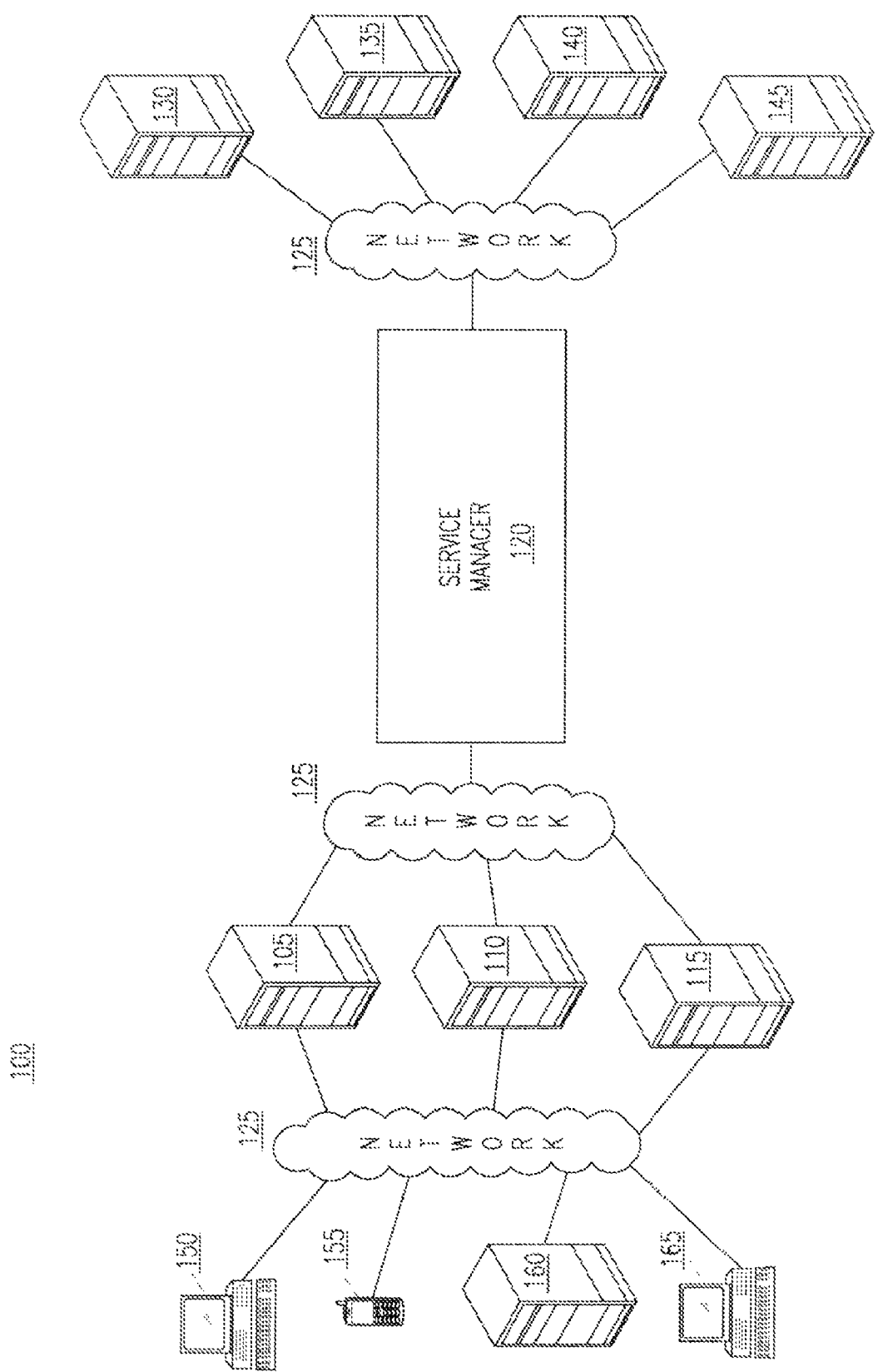
FIG. 1A is a block diagram illustrating an example configuration of a system for providing business services.

As shown in FIG. 1A, a system 100 is illustrated for providing business services to multiple business service consumers. Service consumer computers 105, 110, 115 can communicate with a common service manager 120 across a network 125. The service consumer computers 105, 110, 115 may be any computer device, including computer servers, web servers, and server networks. The service consumer computers 105, 110, 115 pass data to the common service manager 120. Data may include authentication data, communication protocol headers, requests for provision of one or more business services, payload data intended for processing in a business service or by the provider of a business service, resource data relating to service consumer preferences, etc. The common service manager 120 may be further capable of communicating with business service providers 130, 135, 140, 145 over a network 125. In communicating with one or more service providers 130, 135, 140, 145, the common service manager 120 may transmit data to a service provider 130, 135, 140, 145. The data may include a message relating to a business service capable of being provided by one or more of the service providers 130, 135, 140, 145 and may also include (or be derived from) payload data passed to the common service manager 120 by one or more of the service consumer computers 105, 110, 115. The common service manager 120 may be a implemented as a single computer, server, or network of computers or servers running software capable of performing functions relating to a particular implementation of the service manager 120. The service manager 120 may maintain data, for example, in a database or network of databases that stores the instructions, authentication and configuration files, and any other data needed to perform the functions of the service manager 120.

The service providers 130, 135, 140, 145 may transmit return data to the service manager 120 relating to a business service intended for a service consumer 105, 110, 115. For example, the return data may encapsulate the deliverable of a completed service, for example an indication that a credit card number is valid. In other instances, the return data may be partially-processed data intended to be further processed by the service manager 120. For example, the service manager 120 might mask certain payload data relating to the service from the service provider. Only that data approved for delivery to the service provider would be processed by the service provider. The service provider then processes this approved data and outputs return data to the service manager 120, whereby the service manager 120 could then complete the objective of the requested service by processing the return data with the masked data. In some instances, the service manager 120 may be capable of routing this return data to a particular service consumer 105, 110, 115. This return data may be delivered in response to or in accordance with data transmitted to the service manager 120 by a service consumer 105, 110, 115.

The service consumer computers 105, 110, 115 may, in turn, communicate with business clients 150, 155, 160, 165 across a network 125. The network 125 described can be any electronic communications network, for example a LAN, WAN, or the internet. System components may connect to and communicate over the network using any known communication technique, for example via a wire-line (e.g., Ethernet) or a wireless (e.g., IEEE 802.11b, WiMAX, etc.) connection. The network 125 may be a single network, such as the internet, or may be a plurality of distinct networks, including dedicated networks facilitating the individual communications between the common service manager 120 and any combination of the service consumer computers 105, 110, 115 or business service providers 130, 135, 140, 145, as well as communication between individual service consumer computers 105, 110, 115 and individual business clients 150, 155, 160, 165.

Figure 1B:
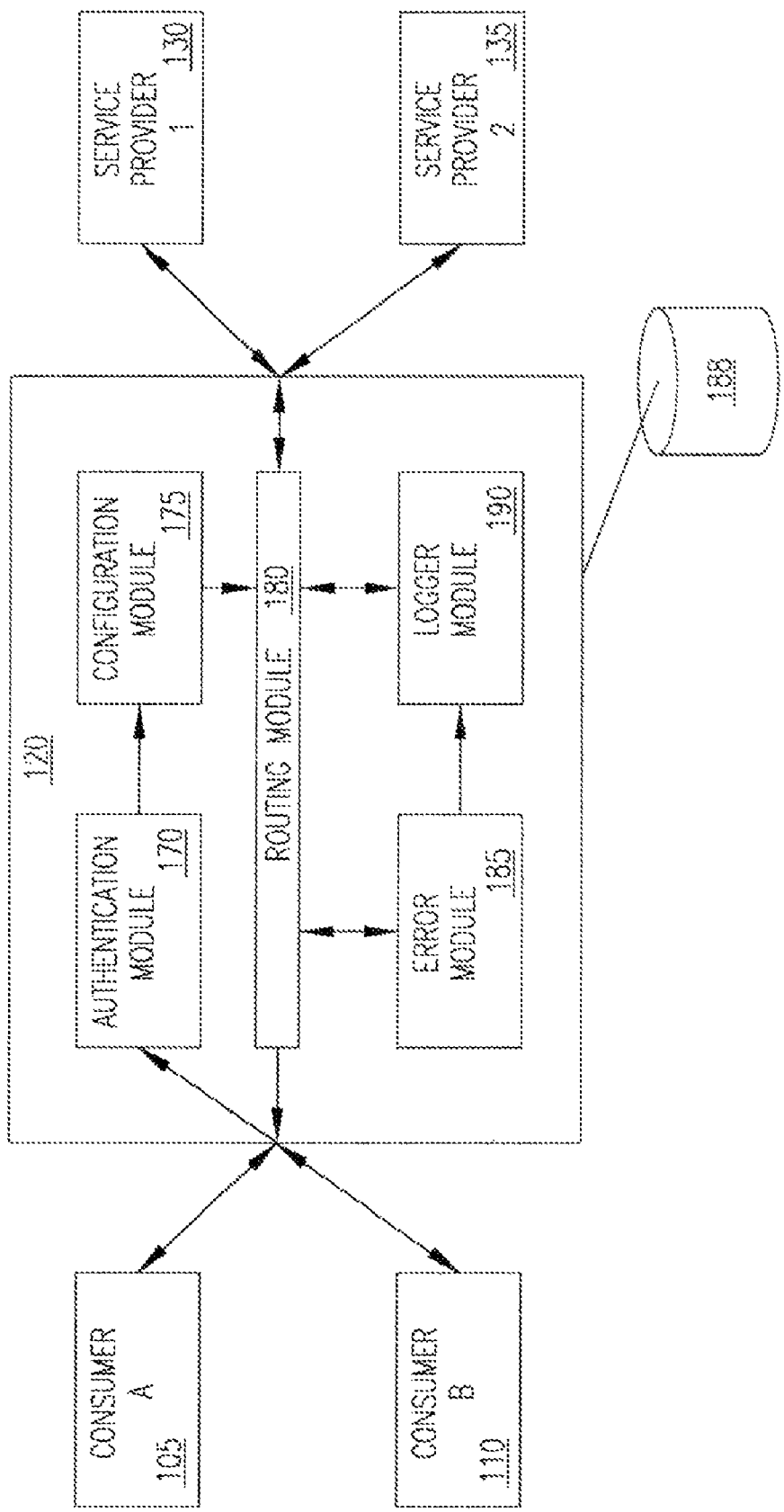
FIG. 1B is a block diagram illustrating an example modular configuration of a system for providing business services.

FIG. 1B illustrates a modular representation of one possible implementation of the system illustrated in FIG. 1A. A common service manager 120 is capable of communicating with service consumers 105, 110 and service providers 130, 135. The service manager 120 can include a user authentication module 170, client configuration module 175, routing module 180, and error module 185.

The user authentication module 170 receives authentication data from service consumers 105, 110. This authentication data can be a password, username, certificate, encryption key, or any other form of data capable of facilitating authentication of a user with a computer or computer system. The authentication module 170 may be capable of processing this data, or the portion of the data relevant to authentication of the specific service consumer, to authenticate that a user, consumer, or consumer-controlled server or computer is allowed to interface and communicate with the service manager 120.

The client configuration module 175 may be implemented so as to manage and utilize configuration files relating to individual service consumers 105, 110 having accounts associated with the service manager 120. Individual service consumers may be discrete business organizations each having separate client relationships with the administrator of the service manager 120. The configuration files may be stored on one or more databases 188 or file systems capable of being accessed and maintained by the configuration module 175. The configuration module may work in cooperation with the authentication module 170, in that authentication data associated with the log-in of a particular service consumer may be linked to corresponding configuration data for that service consumer. As set forth in more detail below, the configuration data may be processed by the configuration module 170 so as to direct the service manager to facilitate provision of a customized business service environment, characterized according to preferences of a service consumer 105, 100, including resource data stored by the service manager 120.

The authentication and configuration modules 170, 175 operating in tandem would allow for the service manager 120 to provide consumer-specific business service environments over a common service manager infrastructure. The service consumers 105, 110 can be, for example, separate and distinct business entities, even competitors within the same industry. Provision of authenticated and secure access, as may be provided by an authentication module 170, together with consumer-specific configuration data that may be provided so as not to be accessible or pertinent to other consumers of the service manager 120, may allow separate business entities to share a common business service infrastructure. This may be successfully achieved despite separate business entities' concerns regarding, for example, the security and confidentiality of data exchanged with service providers, as well as protecting the identity of proprietary services and processes companies utilize and provide in connection with their businesses. Such a system can allow business entities unable to afford to design, program, or maintain a dedicated enterprise software system, to share a centralized service infrastructure while enjoying customizability of the system. Adopting such an arrangement allows the costs of designing, maintaining, and implementing such a system to be spread across multiple business entities, whereas a dedicated system would typically require a single entity to shoulder all of the design, capital, and support costs related to the system.

A routing module 180 may operate in tandem with one or both of the authentication and configuration modules 170, 175. The routing module 180 may be implemented so as to route services from a service provider 130, 135 to a service consumer 105, 110. For example, authentication data may be received by the authentication module 170, authenticating and identifying a certain service consumer. The authentication module 170 communicates this information to the configuration module 175, which matches the consumer's identity to a corresponding configuration profile. The configuration profile may be used automatically, or in conjunction with a request made by the service consumer to call a certain business service to be provided by the service manager. The configuration profile, together with any payload data sent or required in conjunction with the service to be provided, is communicated to the routing module 180. The routing module 180 identifies one or more service providers 130, 135 capable of or responsible for providing the service and calls (e.g., requests) the service provider to provide the service, perhaps using additional payload data sent or associated with the requesting service consumer 105, 110. The service provider 130, 135 returns data corresponding to the business service and the routing module routes this data to the requesting service consumer 105, 110. Routing tasks performed by the routing module may require for network address information, for example an IP address or URL, to be stored on the service manager 120 in conjunction with the service consumers 105, 110 and support service providers 130, 135.

In some implementations, the routing module can additionally process data routed between the service consumers and service providers to, for example, interpret, format, or filter the data so that it is in an acceptable condition for receipt and processing by the receiving service consumer or service provider. Data processing and conditioning performed by the routing module 180 may require additional data to be stored in conjunction with the service consumers 105, 110 and service providers 130, 135 to provide instructions regarding the formatting, filters, or interpretation profiles or preferences of the service consumers 105, 110 and service providers 130, 135. These preferences and profiles may be stored and managed by the configuration module 175, for example, as resource data stored in conjunction with the configuration profile of a service consumer or service provider.

In some implementations an error processing module 185 may be provided. The error processing module 185 may be provided in combination with any one or all of the other modules 170, 175, 180. For example, an error module provided in conjunction with the routing module 175 may operate so as to detect and respond to errors in the routing of data between a service consumer and a service provider. As an example, a service consumer 105 may request that the service manager 120 provide a certain business service. The service manager 120, in response to this request, may call the service from a service provider 130 identified as capable of fielding the service call. It may be, however, that the service provider 130 is offline or otherwise incapable of receiving the request to respond to the service call. The error processing module 185 may be capable of detecting the unavailability of the service provider 130, for example through a time out protocol. The error processing module 185 may then handle the error. For example, the error processing module 185 can return an error message to the requesting service consumer 105, hold the request and retry calling the service provider 130, or identify another service provider 135 capable of handling the service call and direct the routing module 180 to re-route the service call to the alternate service provider 135. The error processing module 185 might also be capable of detecting and handling errors involving communication with and routing to the service consumers 105, 110, or errors involving the authentication or configuration modules 170, 175.

Some implementations of the service manager 120 may provide a logger module 190. The logger module 190 may capture data relating to the service manager's 120 performance of tasks related to providing a business service. For example, the logger module 190 may monitor the performance of the service manager 120, by capturing data relating to service request responsiveness and response times, errors detected by the error module 185, service request traffic, etc. Some implementations of the logger module 180 may provide for the logger module 190 to detect and log service transactions, for example, the number and type of service requests made by various service consumers, the requests forwarded to service providers, the service data sent by service providers and received by the service consumers, etc.

The logger module 190 may operate in conjunction with a database 188 to store data related to the service transactions. As an example, the logger module 190 caches service requests made by the service consumers. In some implementations, the logger module 190 caches payload data relating to a service request as well as service data returned from service providers. Caching service request, payload, and returned service data can be employed, for example, to recover and resend dropped or failed message transmittals or preserve a service transmittal history for service consumers or providers. Additionally, the logger module 190 may also perform a masking function on cached data, masking certain cached data in order to ensure service consumer data security. For example, resource data stored and associated with a service consumer could request that cached payload data or service requests mask data representing the first five digits of a social security number transmitted to a service provider in conjunction with a service request. Similarly, resource data may be used to direct the logger module 190 as to how and what data is cached in relation to or in behalf of a service consumer.

In some implementations, logging service transactions may be employed by the logger module 190 so as to monetize the service manager 120. Where the service manager 120 handles service requests from a plurality of service consumers 105, 110 and receives services and service data from a plurality of service providers 130, 135, logging service transactions involving the respective service consumers and providers allows the controller of the service manager 120 to appropriately bill service consumers for the services they consumer, as well as paying service providers for their contributions to the services provided to the service consumers.

Figure 2:
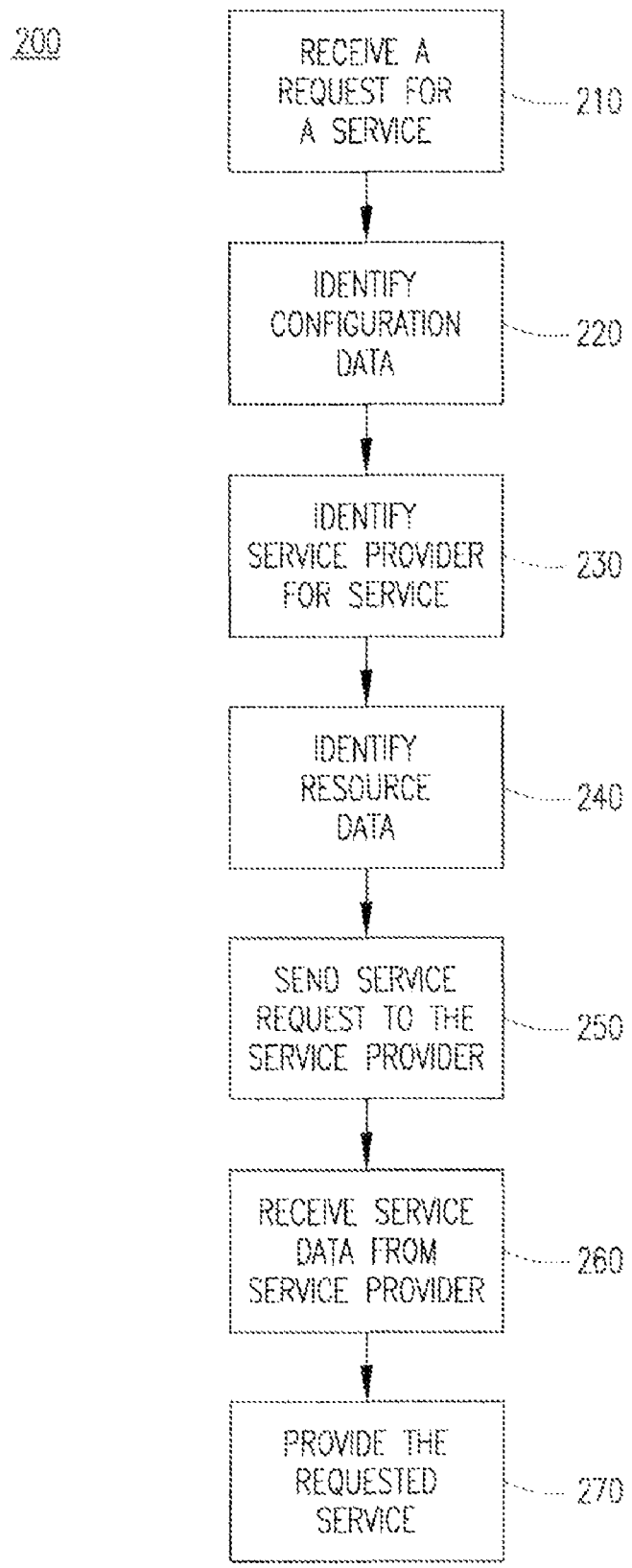
FIG. 2 is a flow diagram of an example process for providing services to business service consumers.

FIG. 2 illustrates one implementation of a process 200 for providing business services to a business services consumer. A request for a particular business service is received from a service provider at 210. The requested business service may be but one of several business services for which requests may be received. Multiple business service providers may be capable of providing at least a portion of the data relating to the various available business services. The source of the request may be identified from the request for a business service received at 210. The source may be the consumer of the particular service. Configuration data is then identified at 220. The configuration data may be identified by associating the identity of the source of the request with certain configuration data associated with the source of the request. Based at least in part on the configuration data identified, a service provider for the particular service may be identified at 230. Additionally, resource data may be identified at 240 from the configuration data identified at 220. The identified service provider is then sent a request for the service at 250. The request for the service may include the resource data identified at 240, as well as other data related to requested service.

Once the request is transmitted at 250, a response to the request is received from the service provider at 260. The response may include data relating to the service request. The service manager then uses this data to provide the requested service to the service consumer 270. The nature of the data returned by the service provider and processed by the service manager may vary from service to service. For example, the data itself may represent a deliverable of the service. For example, if the business service requested is the authentication of a credit card submitted to the service consumer in connection with a transaction handled by the service consumer, the data returned in response to the service request at 260 may be data indicating whether or not the credit card is valid, is overdrawn, matches the cardholder data provided to the service consumer, etc. In instances where the data returned from the service provider is a stand alone deliverable, the service manager may simply forward the data returned to the service consumer. Alternatively, the data returned at 260, while relating to the service to be provided, may require further processing by the service manager prior to being provided to the service consumer. For example, the service provider may provide raw numerical data to the service manager that does not take into account additional calculations or formatting steps required for complete delivery of the service to the service consumer. The service manager may be capable of processing this raw data in order to complete delivery of the service to the service consumer according to the preferences or requirements of the consumer.

Figure 3:
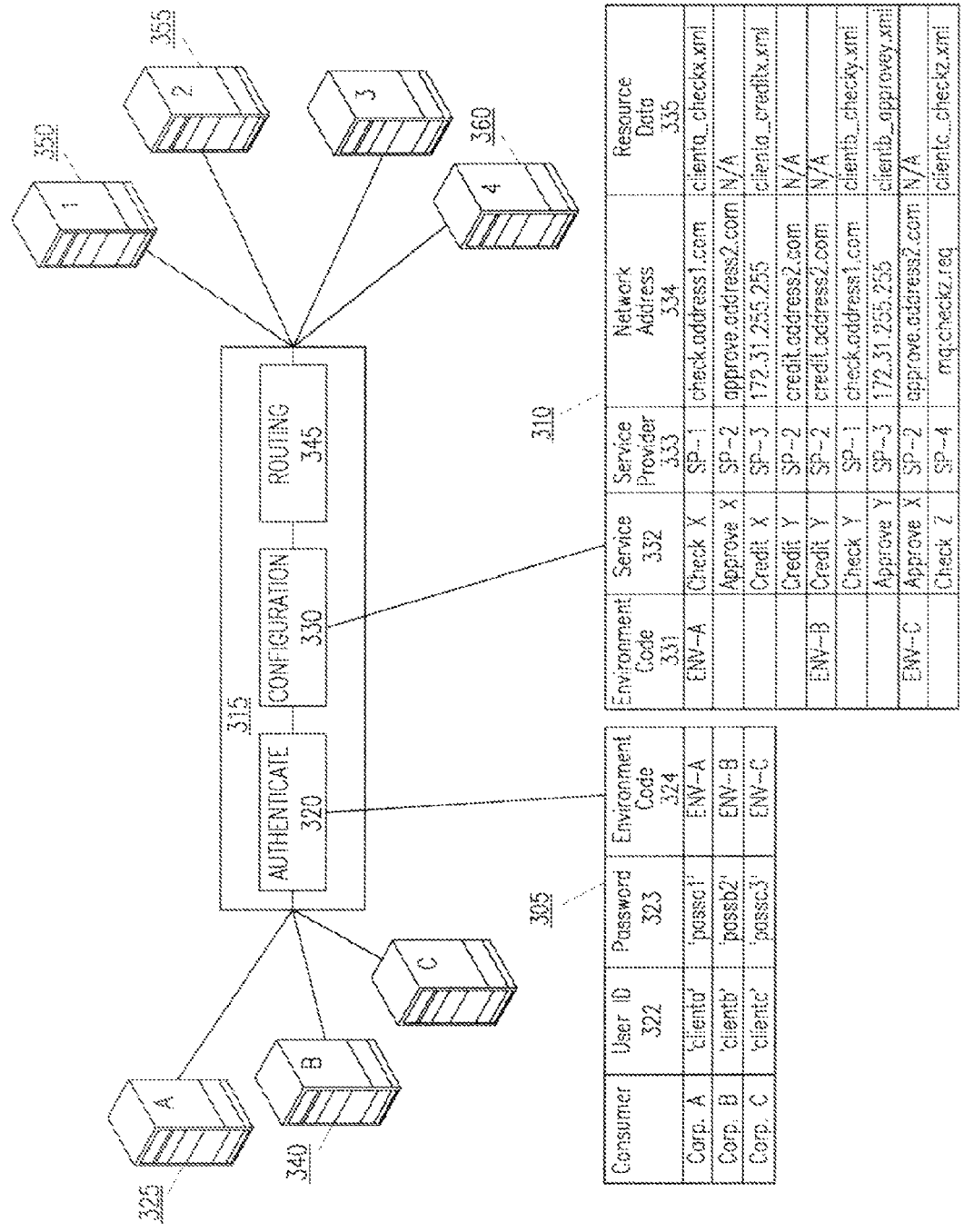
FIG. 3 is a block diagram illustrating an example configuration of a system employing configuration data for providing business services.

FIG. 3 illustrates a possible representation of configuration data used by a common service manager to provide business services to business consumers. Configuration data may include configuration data tables 305, 310, operating in conjunction with a service manager 315. The configuration data 305, 310 may be stored on a server or other computing device having memory. The server hosting the configuration data 305, 310 may also host software and other computing instructions relating to the service manager 315. Alternatively, the server hosting the configuration data may be distinct from the computing equipment hosting the service manager and capable of communicating the configuration data 305, 310 to the service manager computing device via a network, wireline or other communication mechanism. In the example illustrated by FIG. 3, the configuration data 305, 310 and service manager 315 operate to provide services to service consumers A, B and C provided by one or more of service providers 1, 2, 3, or 4. Also, while the configuration data 305, 310 is illustrated in FIG. 3 as two data sets, the configuration may be a single data set or file, or multiple data sets or files.

Authentication data table 305 may operate in conjunction with operations performed by an authentication module 320. The authentication data table 305 may store any information desired for use in authentication of a user or consumer of the service manager 315. In the example table 305, fields for specifying the user ID 322, password 323, and environment code 324 of the three example service consumers A, B, and C are provided. As an example, consumer A may seek to request one or more services from the service manager 315. The server 325 or other computing device seeking to receive the service on behalf of consumer A may send the user ID "clienta" and password "passal" to the service manager 315. These could be sent together in a single transmission or in separate transmissions. The authentication module 320 may then receive the user ID and password passed to the service manager and consult the authentication table 305 to see if the user ID provided matches the password provided. Upon identifying that the user ID "clienta" corresponds to password "passal," the authentication module 320 may identify that the user or consumer accessing the service manager 315, accesses the service manager 315 on behalf of service consumer A and is authorized to do so.

A consumer may alternatively have more than one user ID or password combination assigned to its profile. For example, it may be desirable for a consumer to have multiple user profiles associated with its account to track the log-ins of various departments within the consumer's business entity, track access by various computing devices, web storefronts, service consumer employees, and a service consumer's clients. Unique profiles may be distributed by the service consumer to various subdivisions, affiliates, or personnel associated with the service consumer thereby granting access to the service consumer's service manager account. These unique user access profiles may be assigned to multiple user profiles to, for example, limit access to certain services or create administrative profiles allowing certain users to edit or modify configuration data or other information relating to the service consumer's service manager account. Alternatively, the service consumer may distribute access to its account by sharing a single user name and password. Distribution of authentication information could proceed similarly for other forms of authentication data, such as certificates, security questions, encryption keys, etc.

Once a service consumer is authenticated by the service manager, the identity and service profile or environment of the service consumer may be determined. The authentication data table 305, for example, illustrates an environment code field 324 associated with each of service consumers A, B, and C. Assuming that consumer A has been authenticated, the authentication module 320 may, after identifying consumer A, identify that environment code "ENV-A" corresponds to consumer A's service profile. The authentication module 320 may then pass the environment code for consumer A to a configuration module 330 operating in conjunction with the service manager 315.

Configuration table 310, the second portion of the configuration data in this particular example, may be organized by environment code 331. Additional fields 332, 333, 334, 335 may be included to aid in defining the service consumer's service profile for service manger 315. For example, an account maintained by consumer A may provide for the service manager to provide services CheckX, ApproveX, CreditX, CreditY, whereby these services are, at least in part, provided by various service providers. Accordingly, data relating to these services 332 and the corresponding service providers 333 may be included in the configuration table 310. As illustrated in this example, configuration data within configuration table 310 records that, for consumer A, service provider 1 is assigned with provision of service CheckX, service provider 2 is assigned to provide services ApproveX and CreditY, and service provider 3 is to provide service CreditX.

The configuration table 310 may also include other data relevant to the provision of a business service to a service consumer. For example, service provider location data 334 (or even service consumer location data) may be provided to aid in the routing of requests and services between the service manager, service consumers, and service providers. Location data 334 may include a web-based URL, an IP address, MQ request, or any other addressing format capable of being used to route messages between the service manager and service providers and consumers. Additionally, some services may be configured so as to allow for a service to be formatted or otherwise customized according to user preferences corresponding to, for example, a service consumer or applicable client of a service consumer. Accordingly, resource data 335 may be provided that may be used by either the service manager, the service provider, or both to integrate certain consumer preferences into a service. Other services, may not allow for such preferences to be applied, as illustrated in column 335 with the designation "N/A" in the resource data field.

In one example, consumer B requests, through a computing device 340, that the service manager 315 provide a service CheckY. The request may include data requesting the service as well as authentication data comprising, for example, a user ID ("clientb") and password ("passb2"). The service manager authenticates consumer B and identifies that environment ENV-B corresponds to consumer B. Only consumer B has access to its particular and environment service profile. Consumer B may also have exclusive control over modifications made to its service profile. This exclusive control may be maintained by requiring additional authentication data to ensure that the user requesting the modifications has authorization to do so. Additionally, it may be desirable for service providers to be able to update configuration data if such an update is necessary or desired, for example modifying the network address 334 provided for a certain service.

The service manager 315, identifying this service profile, may identify that service CheckY is available to consumer B under its profile. Identifying services and other details relating to a service consumer's service profile may be delegated to a configuration module 340 operating in conjunction with the service manager 315. The service manager 315 may then identify that service CheckY is to be provided by service provider 1. Configuration data may indicate the network address of service provider 1 designated to handle service calls relating to service CheckY (in this example "check.address1.com.") The configuration module 340 may pass service provider location data 334 to a routing module 345 capable of managing the routing of the service call to service provider 1. Alternatively, the routing module 345 may be able to directly access configuration data related to routing of service calls. In the example illustrated in FIG. 3, service CheckY provided by service provider 1 may provide for resource data 335 to be provided. In this example, the resource data may be passed as an xml file, "clientb_checky.xml." Employing this data as well as any other payload data intended for the service provider, the service manager 315 may then call a server 350 corresponding to service provider 1. The service provider 1, then may respond to the service call, processing the transmitted data, and providing at least some data to the service manager 315 necessary for the service manager 315 to provide service CheckY for consumer B.

In another example, a second service call may be made using the service manager 315. This service call may be made in parallel with the service call of the previous example, whereby service CheckY is provided to consumer B. Here a server associated with consumer C submits a request to the service manager 315 to provide a suite of services, comprising services ApproveX and CheckZ. The service manager 315 may simultaneously provide more than one service to one or more service consumers using the shared runtime environment of the service manager 315. The service manager authenticates consumer C and routes service calls for ApproveX to service provider 2 and CheckZ to service provider 4. The routing module may route these calls in accordance with service provider location data 334 corresponding to services and service providers called. In this example, resource data is only processed relating to the CheckZ service. Servers 355, 360, corresponding to service providers 2 and 4 respectively, then field their respective service calls and return data to the service manager 315 allowing the service manager to simultaneously provide services ApproveX and CheckZ to consumer C. The service manager 315 may additionally provide service CheckY for consumer B at the same time, whereby the service manager appears, to consumers B and C, to be dedicated solely to providing the individual consumer's respective service.

Figure 4:
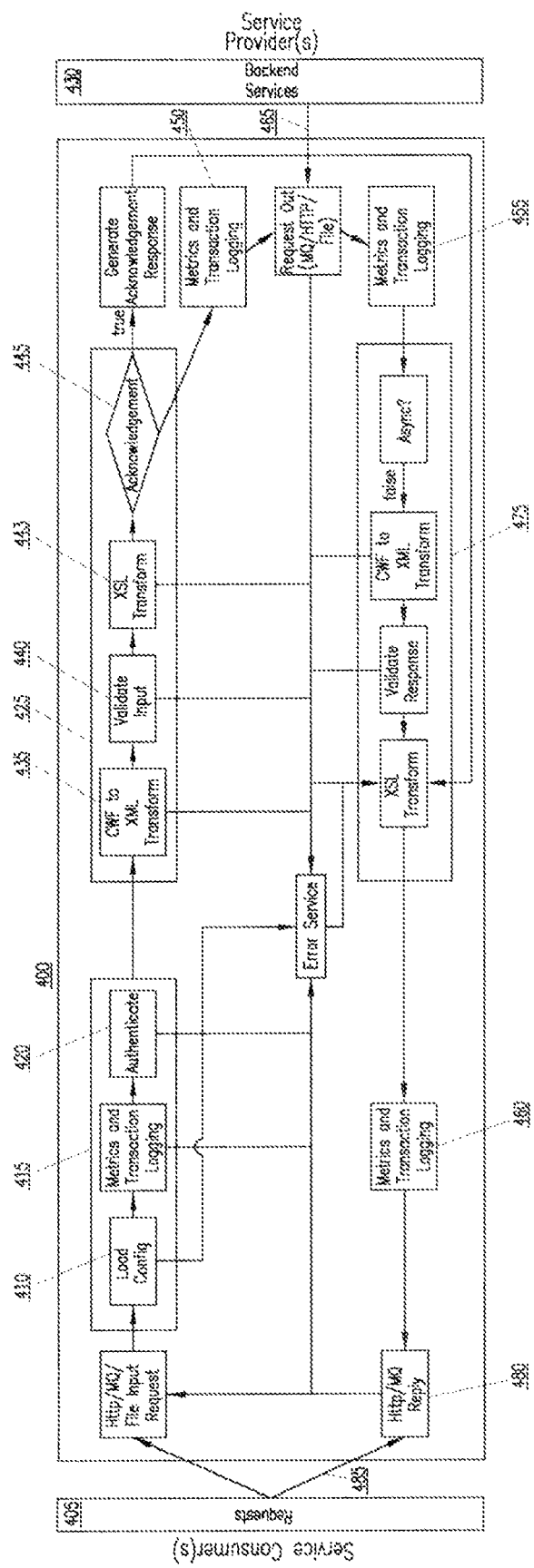
FIG. 4 is an architectural diagram of an example configuration of a system for providing business services.

FIG. 4 illustrates a possible implementation of the architecture of a service manager 400 capable of providing at least one business service to at least one service consumer. This particular implementation of a service manager 400 provides that requests 405 from one or more service consumers are received by the service manager 400. The requests may be delivered as http messages, MQ messages, JMS messages, TCP/IP messages, file-based or database messages, or the like. In this implementation, configuration data may be loaded 410 in response to the request, followed by service metric and service transaction logging 415. Note that authentication 420, in this particular embodiment, is accomplished by the service manager 400 following loading of configuration data. Implementations of the service manager 400 may perform authentication, configuration, and transaction logging in any order. Indeed, authentication might also be carried out together with the loading of configuration data, or be divided into steps occurring before and after configuration. As an example, a request may seek to invoke a particular service. The request might also contain consumer user ID data, or other data identifying the consumer invoking the service. The service manager 400 might then load the configuration data relating to both the service requested as well as the consumer identification data. If the service manager 400 determines that the requested service and/or consumer identification data are legitimate it might then request a user password or other authentication data capable of authenticating the party invoking the service. Carrying out authentication in this manner allows, among other considerations, for loading configuration data that may be capable of instructing the service manager 400 how to communicate with the requesting consumer.

Upon performing configuration 410, logging 415, and authentication 420 related to the request, the service manager may process the request message 425 for delivery to the service provider(s) 430. This message processing may be performed by a routing module on the service manager 400. Message processing 425 may include reformatting or transforming payload data included in the request. For example, the data may be in a non-xml format, the service manager 400 transforming the data into xml 435. Message processing can also include validating 440 that the payload data is appropriate or properly formatted for the service requested. The request, including a data payload, can be further processed with an XSL transform 443 appropriate for packaging the xml data is a format convenient or necessary for processing by the service provider in accordance with the requested service. Additional or substitute transforms may also be provided, depending on the requirements of the service, the consumer, or service provider. Such requirements can be related through resource data associated with a service consumer or service request. Additionally, some requests or messages transmitted by a service consumer may be intended for the service manager 400 and do not need to be passed to a service provider. For example, the service consumer may send the service manager 400 an acknowledgment message that a service, or other data related to a service, was received by the service consumer from or through the service manager 400. The service manager 400 can process the request 445 to determine if the request or portions of the request data are not intended for a service provider. For example, if the request is not intended for the service provider, the service manager 400 can generate a response message relating that the request, such as an acknowledgement request, was received and properly processed.

After the request message is processed 425, the service manager can perform additional logging 450, 455, 460, for example, to monitor service transactions, delivery, as well as the performance and accuracy of processing steps performed by the service manager. Once the request message and payload data are processed, and any desired logging is performed, the service manger 400 may then transmit 465 the request data to the appropriate service provider 430. The service provider 430 may then provide a business service to be provided by the service manager 400 or business service data used by the service manager 400 to provide the service to the service consumer. This data may be processed 475 in a manner similar to the message processing 425 carried out on the service request data. Resulting service data intended for the service consumer may then be packaged for forwarding to the service consumer by, for example, converting the message into an html or MQ message 480. The resulting service data is then transmitted 485 to the service consumer to fulfill, at least, in part the service consumer's service request 405.

Implementations of the subject matter and the functional operations described in this specification can be implemented in digital electronic circuitry, or in firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a non-transitory computer readable storage device for execution by, or to control the operation of, data processing apparatus. The computer readable storage device can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for providing services to a plurality of business organization clients, the method comprising:
    receiving a request for a particular service provided by one of a plurality of service providers, wherein the request includes an identification of a first one of a plurality of business organization clients, wherein each of the business organization clients has corresponding configuration data;
    identifying first configuration data corresponding to the first business organization client, at least a portion of the first configuration data designating a first environment under which the first business organization client operates, the first environment defining a first subset of service providers available to the first business organization client;
    identifying a service provider for the particular service based at least in part on the first configuration data;
    identifying first resource data from the first configuration data corresponding to the particular service;
    sending a service request for the particular service to the identified service provider, wherein the service request identifies the first resource data;
    receiving data relating to the service request from the identified service provider; and
    providing the particular service to the first business organization client in a shared runtime environment based at least in part on the received data.

2. The method of claim 1, further comprising:
    receiving a second request for a second service provided by a service provider of the second service, wherein the second request includes an identification of a second one of a plurality of business organization clients;

identifying second configuration data corresponding to the second business organization client, at least a portion of the configuration data designating a second environment under which the second business organization client operates, the second environment defining a second subset of service providers, independent of said first subset, that is available to the second business organization client;

identifying the service provider of the second service based at least in part on the second configuration data;

identifying second resource data from the second configuration data corresponding to the second service;

sending a service request for the second service to the service provider of the second service, wherein the service request identifies the second resource data;

receiving data relating to the service request for the second service from the service provider of the second service; and providing the second service to the second business organization client based at least in part on the received data relating to the service request for the second service.

3. The method of claim 1 wherein the request for a particular service further comprises payload data related to the particular service.

4. The method of claim 1 wherein providing the particular service comprises passing the data relating to the service request received from the identified service provider to the first business organization client.

5. The method of claim 1 further comprising processing the data relating to the service request received from the identified service provider prior to providing the particular service to the first business organization client in a shared runtime environment.

6. The method of claim 1 further comprising:
receiving a second request for a second service provided by one of the plurality of service providers, wherein the second request includes an identification of the first business organization client;
identifying second configuration data corresponding to the first business organization client in response to the second request;
identifying a service provider of the second service based at least in part on the second configuration data;
identifying second resource data from the second configuration data corresponding to the second service;
sending a service request for the second service to the identified service provider of the second service, wherein the service request for the second service identifies the second resource data corresponding to the second service;
receiving data relating to the service request for the second service from the identified service provider of the second service; and
providing the second service to the first business organization client in a shared runtime environment based at least in part on the received data relating to the service request for the second service.

7. The method of claim 1 further comprising:
receiving authentication data in connection with the identification of a first one of a plurality of business organization clients; and
affirming that the client credentials correspond to the first business organization client prior to sending the service request to the identified service provider.

8. The method of claim 1 further comprising:
caching data comprising at least one of the service request, payload data relating to the service request, or received data relating to the service request.

9. The method of claim 8, the method further comprising:
masking at least a portion of the cached data based at least in part on the first resource data.

10. A system comprising:
a service manager that:
receives a request for a particular service from at least one of a plurality of business organization clients capable of transmitting the request for a particular service,
identifies a first business organization client from the request,
stores configuration data corresponding to each of the plurality of business organization clients, at least a portion of the configuration data defining an environment service profile, each environment service profile defining a different subset of service providers available to a respective business organization client;
identifies at least one service provider, capable of providing data corresponding to a request for a particular service, and first resource data based at least in part on first configuration data corresponding to the first business organization client;
sends a service request to the at least one service provider, wherein the service request comprises the first resource data;
receives data corresponding to the request for a particular service, and
provides the particular service to the first business organization client in a shared runtime environment based at least in part on the received data corresponding to the request for a particular service.

11. The system of claim 10 wherein the service manager comprises a user authentication module, wherein the user authentication module identifies the first business organization client from the request.

12. The system of claim 11 wherein the user authentication module further receives user credentials associated with the first business organization client and authenticates the first business organization client based at least in part on the user credentials.

13. The system of claim 10 wherein the service manager comprises a configuration module, wherein the configuration module identifies the at least one service provider and first resource data based at least in part on the first configuration data.

14. The system of claim 10 wherein the service manager simultaneously provides a plurality of services to a plurality of business organization clients.

15. The system of claim 10 wherein the service manager comprises a logger module that monitors service manager performance and stores data relating to service manager performance.

16. An article comprising a non-transitory machine-readable medium storing instructions for causing computer processing apparatus to perform operations comprising:
interpreting a received request for a particular service provided by one of a plurality of service providers to identify a first one of a plurality of business organization clients;
selectively retrieving stored configuration data corresponding to each of the plurality of business organization clients, at least a portion of the configuration data defining an environment service profile under which each business organization client operates, each environment service profile defining a different subset of service providers available to a respective business organization client;
identifying first configuration data from the stored configuration data corresponding to the first business organization client;
identifying a service provider for the particular service based at least in part on the first configuration data;
identifying first resource data from the first configuration data corresponding to the particular service;
sending a service request for the particular service to the identified service provider, wherein the service request identifies the first resource data;
receiving data relating to the service request from the identified service provider; and
processing the received data relating to the service request to provide the particular service to the first business organization client in a shared runtime environment.

17. The article of claim 16 wherein the machine-readable medium further stores instructions for causing computer processing apparatus to perform operations comprising:
interpreting a second received request for a second service provided by one of a plurality of remote service providers to identify a second one of a plurality of business organization clients;
identifying second configuration data from the stored configuration data corresponding to the second business organization client;
identifying a service provider for the second service based at least in part on the second configuration data;
identifying second resource data from the second configuration data corresponding to the second service;
sending a service request for the second service to the identified service provider for the second service, wherein the service request identifies the second resource data;
receiving data relating to the service request for the second service from the identified service provider for the second service; and
processing the received data relating to the service request for the second service to provide the second service to the second business organization client in a shared runtime environment.

18. The article of claim 16 wherein the machine-readable medium further stores instructions for causing computer processing apparatus to perform operations comprising:
receiving authentication data from the source of the request for the particular service; and
processing the authentication data to interpret whether the source of the request is authorized to request the particular service.

19. The article of claim 16 wherein the machine-readable medium further stores instructions for causing computer processing apparatus to perform operations comprising:
receiving a modification request from the first business organization client to modify configuration data relating to the first business organization client; and
modifying the configuration data in accordance with the modification request.

20. The article of claim 19 wherein the machine-readable medium further stores instructions for causing computer processing apparatus to perform operations comprising:
receiving authentication data from the source of the modification request; and
processing the authentication data to interpret whether the source of the modification request is authorized to modify configuration data relating to the first business organization client.

21. The article of claim 16 wherein the machine-readable medium further stores instructions for causing computer processing apparatus to perform operations comprising:
receiving a service update request from a first one of the plurality of service providers, wherein the service update requests updating configuration data related to at least one service administered by the service provider; and
modifying the configuration data in accordance with the service update request.

* * * * *